(12) United States Patent
Chyou et al.

(10) Patent No.: US 9,121,348 B2
(45) Date of Patent: Sep. 1, 2015

(54) HYDROGEN-RICH GAS COMBUSTION DEVICE

(75) Inventors: Yau-Pin Chyou, Taipei (TW);
Shenqyang Shy, Taoyuan County (TW);
Chien-Chia Liu, Taoyuan County (TW);
Chih-Yang Wu, Taoyuan County (TW)

(73) Assignee: INSTITUTE OF NUCLEAR ENERGY RESEARCH, ATOMIC ENERGY COUNCIL, Executive Yuan, R.O.C., Lungtan, Taoyuan (TW)

( * ) Notice: Subject to any disclaimer, the term of this patent is extended or adjusted under 35 U.S.C. 154(b) by 675 days.

(21) Appl. No.: 13/453,339

(22) Filed: Apr. 23, 2012

(65) Prior Publication Data

US 2013/0104520 A1    May 2, 2013

(30) Foreign Application Priority Data

Oct. 31, 2011  (TW) .............................. 100139646 A

(51) Int. Cl.
| F23D 14/48 | (2006.01) |
| F02C 3/22 | (2006.01) |
| F23R 3/14 | (2006.01) |
| F23R 3/28 | (2006.01) |
| F23D 14/24 | (2006.01) |
| F23D 14/82 | (2006.01) |

(52) U.S. Cl.
CPC . *F02C 3/22* (2013.01); *F23D 14/24* (2013.01); *F23D 14/82* (2013.01); *F23R 3/14* (2013.01); *F23R 3/283* (2013.01); *F23D 2214/00* (2013.01); *F23R 2900/00002* (2013.01); *F23R 2900/03042* (2013.01)

(58) Field of Classification Search
CPC .............. F02C 3/22; F23R 3/14; F23R 3/283; F23R 2900/00002; F23R 2900/03042; F23D 14/24; F23D 14/82; F23D 2214/00
USPC ........... 60/722, 734, 737, 738, 739, 740, 748, 60/752, 754, 755, 757, 796, 797
See application file for complete search history.

(56) References Cited

U.S. PATENT DOCUMENTS

| 2,595,999 | A | * | 5/1952 | Boyd et al. ...................... 60/752 |
| 3,853,273 | A | * | 12/1974 | Bahr et al. ..................... 239/402 |
| 4,244,178 | A | * | 1/1981 | Herman et al. ................. 60/754 |
| 4,653,278 | A | * | 3/1987 | Vinson et al. ................... 60/737 |
| 5,345,768 | A | * | 9/1994 | Washam et al. ................ 60/737 |
| 5,622,054 | A | * | 4/1997 | Tingle .............................. 60/737 |
| 5,673,551 | A | * | 10/1997 | Dobbeling ....................... 60/776 |
| 6,094,916 | A | * | 8/2000 | Puri et al. ........................ 60/737 |
| 6,151,899 | A | * | 11/2000 | Park ................................ 60/748 |
| 6,684,640 | B2 | * | 2/2004 | McMillan et al. .............. 60/737 |
| 6,820,411 | B2 | * | 11/2004 | Pederson et al. ............... 60/229 |
| 6,832,482 | B2 | * | 12/2004 | Martling et al. ................ 60/737 |

* cited by examiner

*Primary Examiner* — Steven Sutherland
(74) *Attorney, Agent, or Firm* — Jackson IPG PLLC; Demian K. Jackson

(57) ABSTRACT

A combustion device for hydrogen-rich gas is provided. Before entering a chamber, fuel and air are non-premixed for avoiding flushback. A vortex generator and a fuel sprayer are combined to mix fuel and air for enhancing burning effect. Vortex flame is generated with stabilizing aerodynamics of flow provided through vortex breakdown. A flameholder is formed downstream an injector to maintain stable combustion. Cooling air is introduced from a sheath to cool down a high-temperature gas, which leaves the combustion chamber and drives a turbine for turning a power generator. Thus, the present invention effectively mixes fuel and air, avoids flushback and prevents combustor damage.

14 Claims, 12 Drawing Sheets

HYDROGEN-RICH GAS COMBUSTION DEVICE

TECHNICAL FIELD OF THE INVENTION

The present invention relates to combustion for hydrogen-rich gas; more particularly, relates to a combustion device with features of effectively mixing fuel and air, avoiding flushback and preventing combustor damage.

DESCRIPTION OF THE RELATED ARTS

According to IPCC 2007 AR4, $CO_2$ generated by burning fossil fuel is the main cause of green house effect. Because of the convenience of the fossil fuel, it is expected that the fossil fuel still plays a key role in power generation. According to the report of BP 2010, coal can still be mined for 119 years, far longer than 40 years for oil and 60 years for natural gas. Hence, technologies for new and clean energy resources are developed. For example, technologies concerning changing coal into a clean energy resource are developed, especially gasification technology.

Gasification technology has flexibility on using various carbon-based materials, like fossil fuel, hard coke, biomass, municipal solid waste (MSW), etc. The various materials are processed through gasification to be made into multiple products for power generation (bio-hydrogen, vapor, composed gas fuel, liquid fuel and chemicals, etc.) by using low-class coal or even waste, which has become a trend for future development. Gasification procedure of coal for generating hydrogen comprises gasifying coal; purifying gasified gas; obtaining a composed gas of CO, $CO_2$ and $H_2$; transforming water vapor and CO into $H_2$ and $CO_2$; separating $H_2$ and $CO_2$ to obtain hydrogen; and capturing $CO_2$ to be stored. In the other hand, key issues also include improving burning effect and enhancing energy generation.

Combined-cycle generation system is the best generation system using fossil fuel. Yet, it can only use gas or liquid fuel, like natural gas and diesel oil. Hence, clean coal combustion technology uses gasification to combine low-cost fire coal with an efficient multi-cycle system, which is a mainstream for power generation in the future. In the long run, gasification is mainly used in a power plant having almost no waste gas discharged.

Traditionally, big power plant uses a central electricity generation system, where the generated power is then transduced, transferred and distributed to clients. In the other hand, a distributed generation system uses small or middle power plants at the client's ends to solve problems of district restriction, like problems on power network construction and power transportation. Micro-turbine generator is one of the possible solutions for distributed generation, which effectively mends up shortness of the central electricity generation system and even replaces some central electricity generation systems in some specific territories.

Low-pollution combustor is a key device in a gas turbine, whose burning effect is critical to a multi-cycle generation system. A general natural gas combustor usually uses pre-mixed fuel and air for input to obtain good burning effect and low-discharged waste gas. However, the way hydrogen burns in the natural gas combustor is quite different from the way natural gas burns, where flame transfers much faster in hydrogen than in natural gas. As a result, the natural gas combustor, a premixed combustor, would have flushback and cause damage if inputted with hydrogen-containing gas. For the same reason, if the micro-turbine generator is inputted with hydrogen-rich gas, flushback would also happen with danger of high temperature.

Moreover, in a modern age of hydrogen energy, electro-chemical transformation is used to transform hydrogen energy into electrical energy. In another word, some hydrogen still remains in the discharged waste gas. Hence, the waste gas should be collected and re-used for improving performance of hydrogen-energy transformation system.

Hence, the prior arts do not fulfill all users' requests on actual use.

SUMMARY OF THE INVENTION

The main purpose of the present invention is to effectively mix fuel and air with flushback avoided and combustor damage prevented.

To achieve the above purpose, the present invention is a hydrogen-rich gas combustion device, comprising a chamber, a cooling air sheath, a fuel sprayer, a vortex generator, an igniter and a vessel shell, where the chamber has a non-premixed air conduit inside; the chamber has an air distributor at an end of the chamber corresponding to the non-premixed air conduit; and the chamber has a non-premixed fuel conduit at a side of the chamber; where the cooling air sheath is positioned at another end of the chamber; the cooling air sheath has a plurality of holes on the surrounding wall; the cooling air sheath defines a combustion chamber inside; and the cooling air sheath has a first corresponding hole to accommodate the igniter; where the fuel sprayer is located in the chamber; and the fuel sprayer is connected with the non-premixed fuel conduit; where the vortex generator is positioned around the fuel sprayer; and the vortex generator defines a partially pre-mixing annulus downstream in an annular space between the fuel sprayer and the chamber; where the igniter is located at a side of the cooling air sheath and is corresponding to the fuel sprayer; and where the vessel shell is sleeved outside around the chamber and the cooling air sheath to define a cooling air conduit in the vessel shell; and the vessel shell has a second corresponding hole to be connected with the non-premixed fuel conduit. Accordingly, a novel hydrogen-rich gas combustion device is obtained.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

Figure 1:
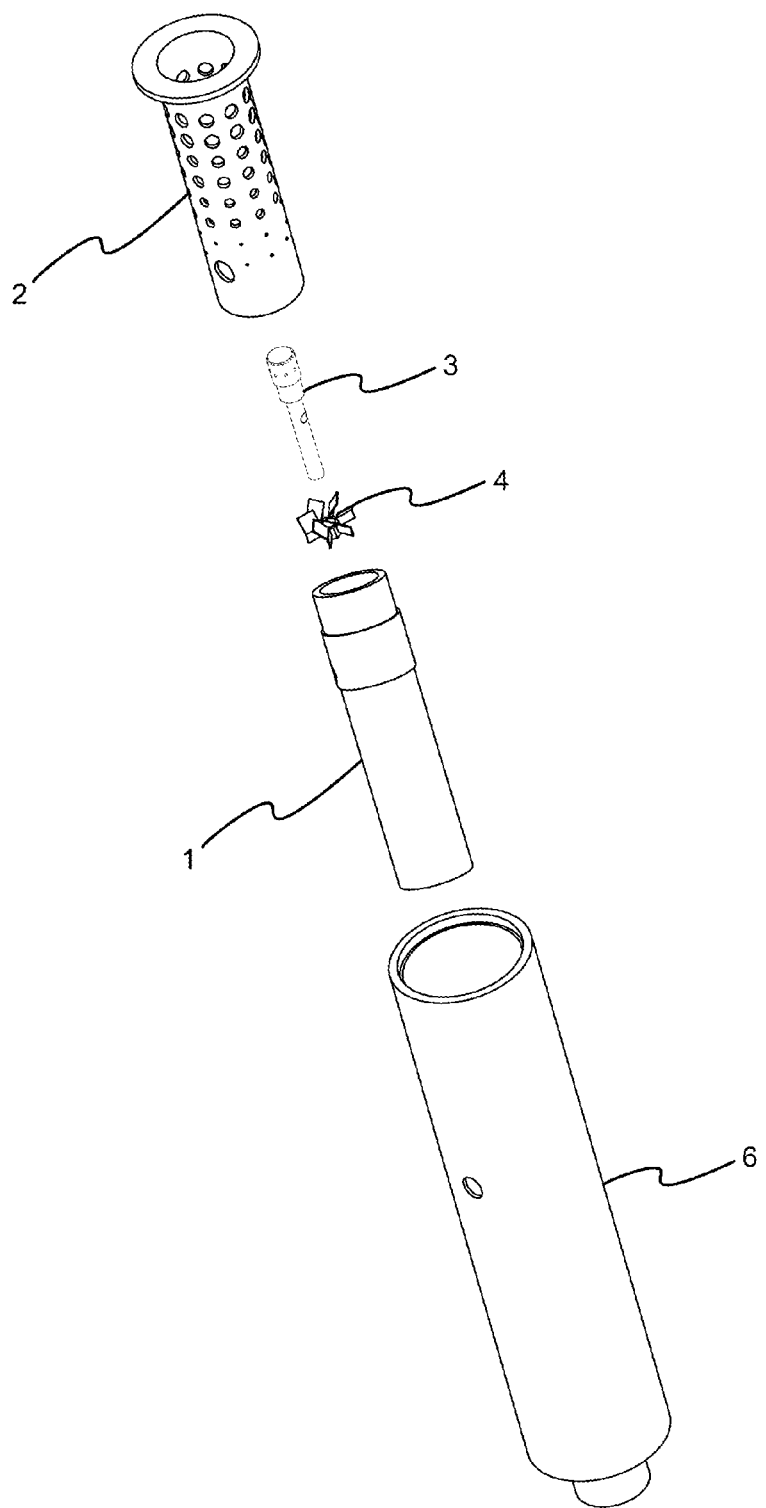
FIG. 1 is the explosive view showing the preferred embodiment according to the present invention.
Figure 2:
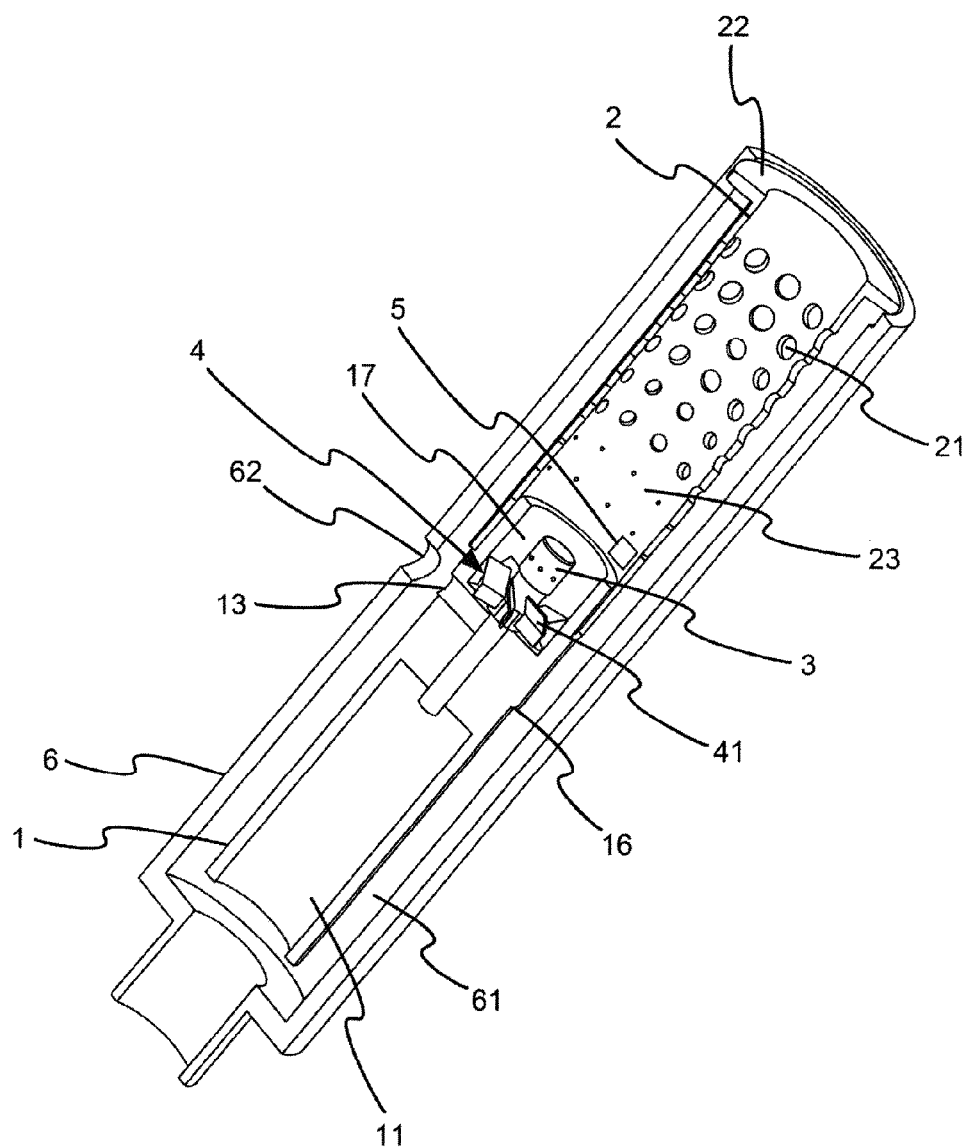
FIG. 2 is the sectional view showing the preferred embodiment.
Figure 3:
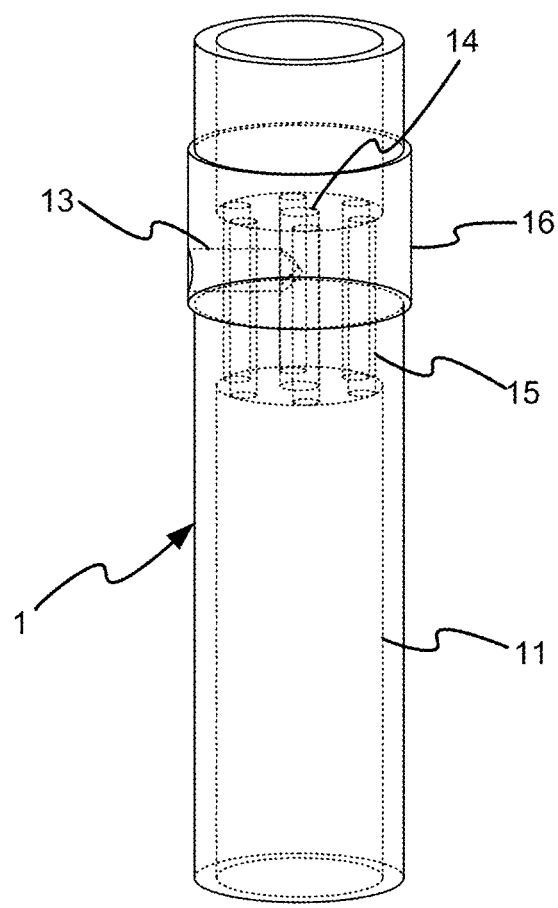
FIG. 3 is the view showing the chamber.
Figure 4:
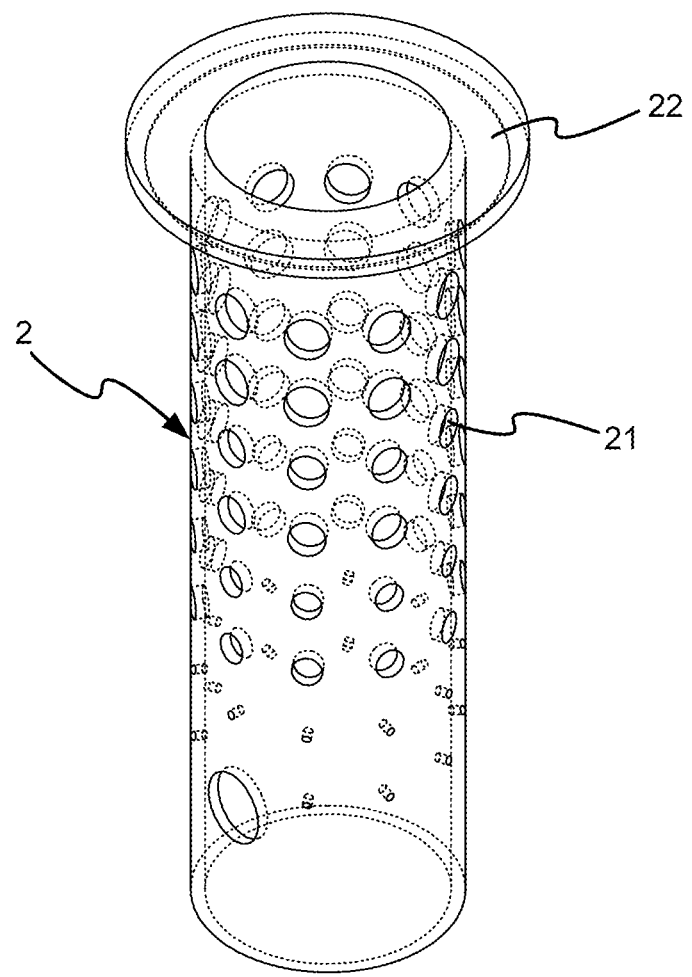
FIG. 4 is the view showing the cooling air sheath.
Figure 5:
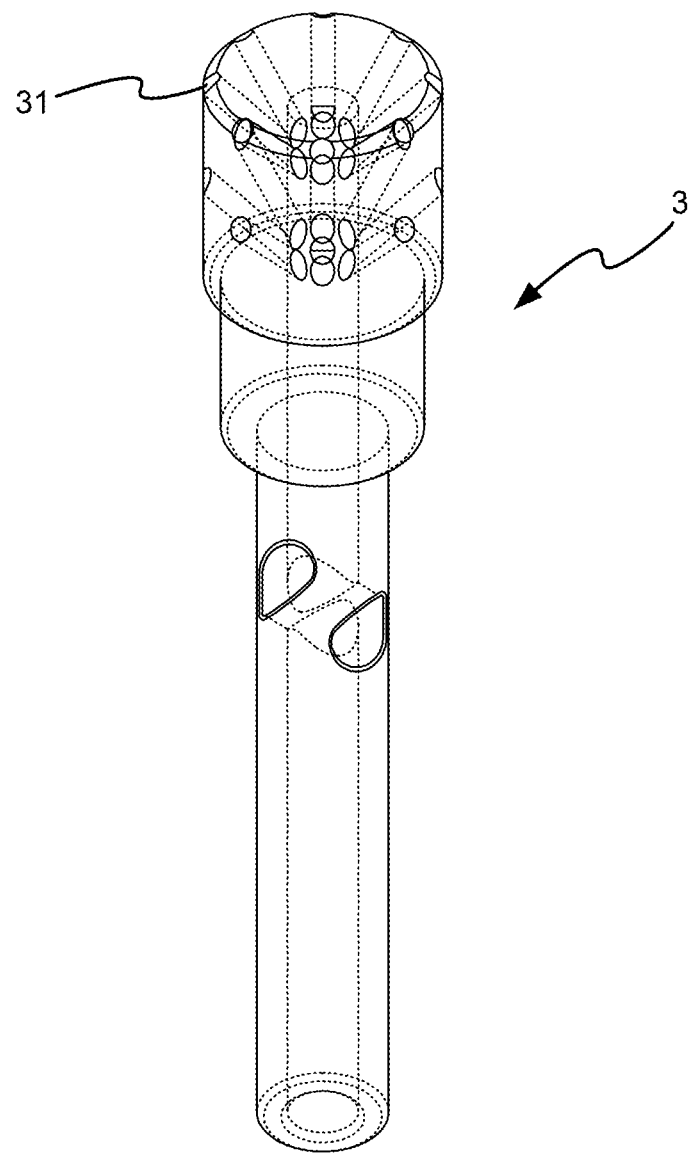
FIG. 5 is the view showing the fuel sprayer.
Figure 6:
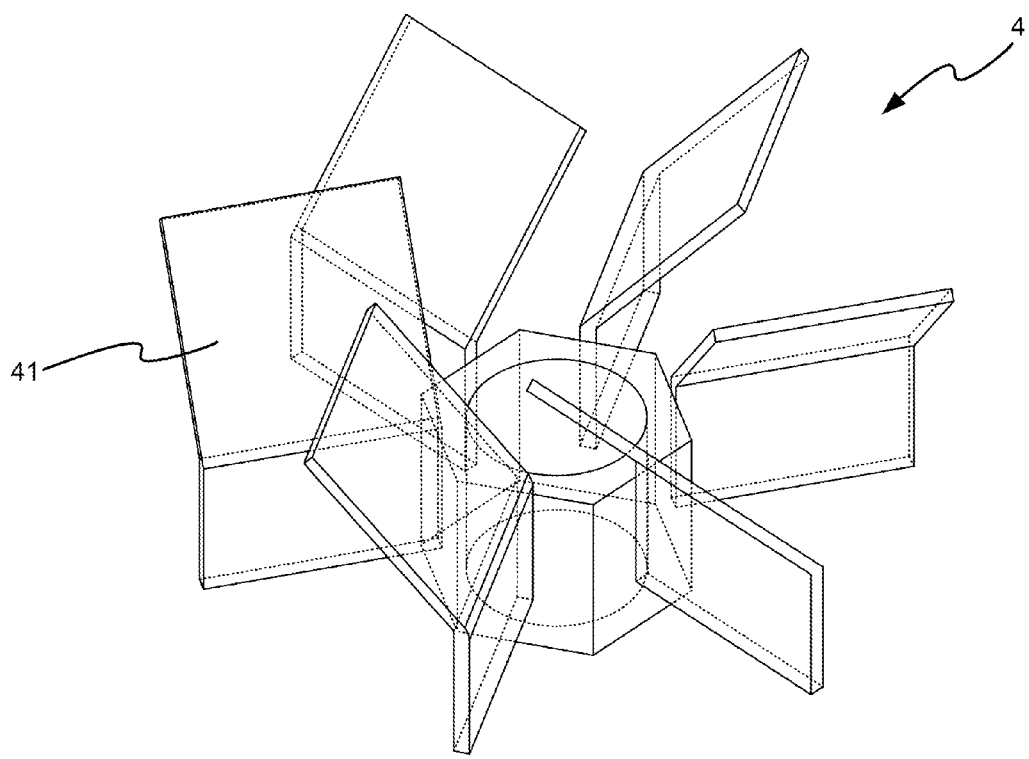
FIG. 6 is the view showing the vortex generator.
Figure 7:
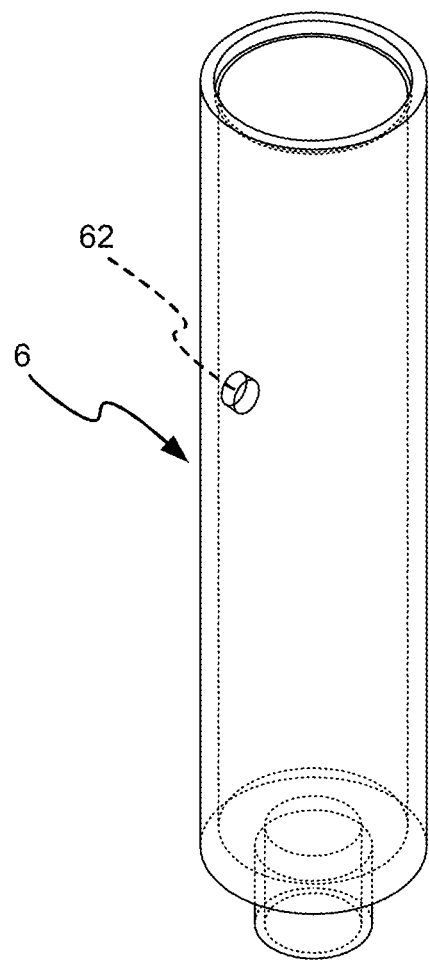
FIG. 7 is the view showing the vessel shell.
Figure 8:
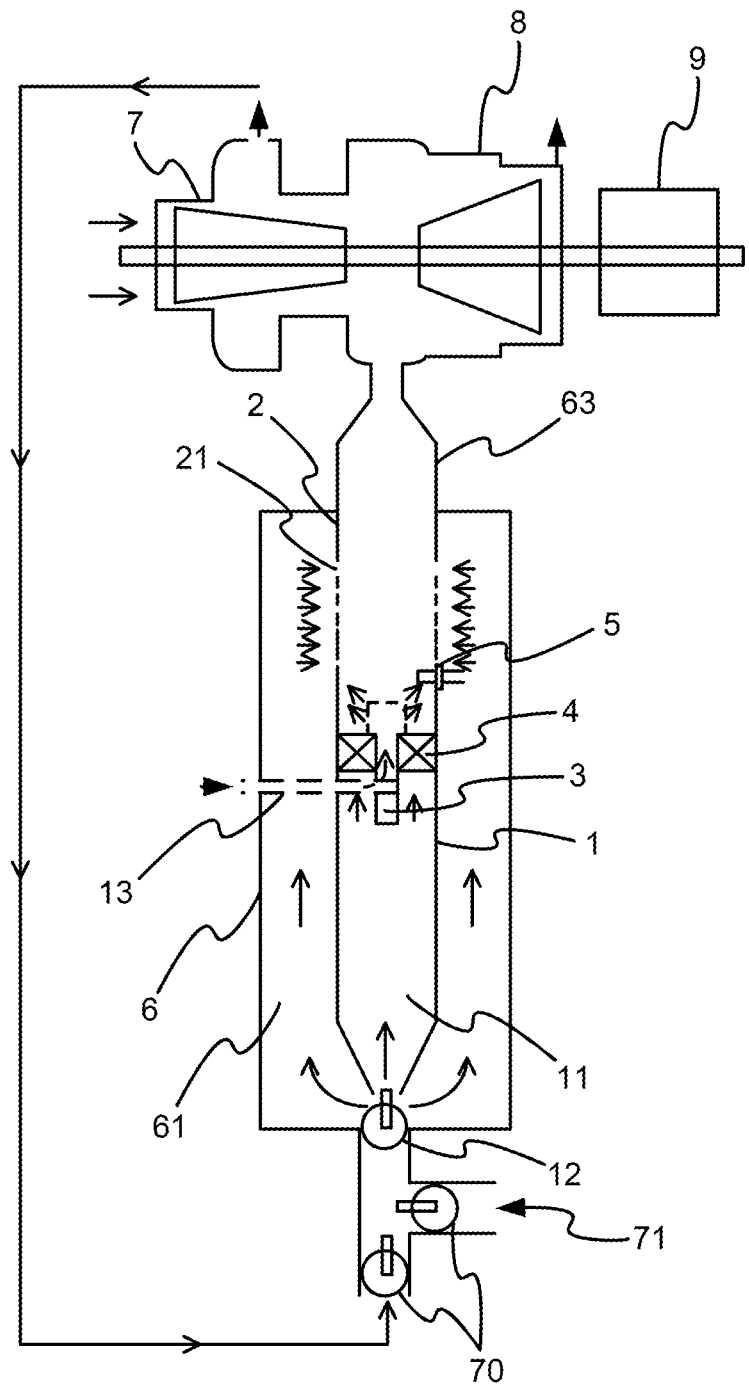
FIG. 8 is the view showing the state-of-use of the preferred embodiment.

The following description of the preferred embodiment is provided to understand the features and the structures of the present invention.

Please refer to FIG. 1 to FIG. 8, which are an explosive view and a sectional view showing a preferred embodiment according to the present invention; views showing a chamber, a cooling air sheath, a fuel sprayer, a vortex generator and a vessel shell; and a view showing a state-of-use of the preferred embodiment. As shown in the figure, the present invention is a hydrogen-rich gas combustion device, comprising a chamber 1, a cooling air sheath 2, a fuel sprayer 3, a vortex generator 4, an igniter 5 and a vessel shell 6.

The chamber 1 has a non-premixed air conduit 11 inside; the chamber 1 has an air distributor 12 at an end corresponding to the non-premixed air conduit 11; the chamber 1 has a non-premixed fuel conduit 13 at a side; the chamber 1 has an opening 14 near another end; the non-premixed fuel conduit 13 is connected with the opening 14; a plurality of connecting holes 15 are set around the opening 14; the non-premixed air conduit 11 is connected with the plurality of connecting holes 15; and, the chamber 1 has a stopper 16 around outside surface of the chamber 1.

The cooling air sheath 2 is combined at the another end of the chamber 1; an end of the cooling air sheath 2 is mounted against the stopper 16; the cooling air sheath 2 has a plurality of holes 21 on surrounding wall of the cooling air sheath 2; the plurality of holes 21 is distributed along a gas flow direction into a plurality of rows having an equal interval between every neighboring rows; a diameter of the hole 21 in each of the rows increases along the gas flow direction; the cooling air sheath 2 is a cylinder and has a flange baffle 22 disposed on top of a downstream end of the cooling air sheath 2; a combustion chamber 23 is defined inside the cooling air sheath 2; and, the cooling air sheath 2 has a first corresponding hole 24 to accommodate the igniter 5, where the first corresponding hole 24 is set near a position mounted against the end of the chamber 1.

The fuel sprayer 3 is set in the opening 14 of the chamber 1 and is connected with the non-premixed fuel conduit 13; and, the fuel sprayer 3 has a plurality of nozzles 31 arranged with a certain angle relative to a flow direction around the fuel sprayer 3 to spray fuel in a radial way for further interact with air downstream the vortex generator 4 for uniformly mixing fuel with air.

The vortex generator 4 is set around the fuel sprayer 3 and has a plurality of blades 41, where air in the non-premixed air conduit 11 of the chamber 1 enters into the vortex generator 4 through the plurality of connecting holes 15 to be guided by the plurality of blades 41 for changing flowing direction of air to generate a swirling flow field around the fuel sprayer 3; and, thus, a partially pre-mixing annulus 17 is formed downstream the vortex generator 4 in the chamber 1 for preliminarily mixing fuel and air.

The igniter 5 is set at a side of the combustion chamber 23 and is corresponding to the fuel sprayer 3.

The vessel shell 6 is sleeved outside around the chamber 1 and the cooling air sheath 2 with the flange baffle 11 of the cooling air sheath 2 covered on top of the vessel shell 6 to define a cooling gas conduit 61 in the vessel shell 6; and, a second corresponding hole 62 is set on the vessel shell 6 to be connected with the non-premixed fuel conduit 13.

Thus, a novel hydrogen-rich gas combustion device is obtained.

On using the present invention, the air distributor 12 of the chamber 1 is connected with an auxiliary gas source 71 or a compressor 7; a valve 70 is set between the air distributor 12 and the auxiliary gas source 71 or the compressor 7; the cooling air sheath 2 and the vessel shell 6 are connected with a turbine 8 (or a power turbine) through the combustor outlet 63 to provide mechanical drive power for rotational machinery; the turbine 8 is connected with a power generator 9; fuel and air are filled into the chamber 1 through the non-premixed fuel conduit 13 and the non-premixed air conduit 11 in a non-premixed way, respectively; the vortex generator 4 changes an original linear air flow into a vortex air flow around nozzle for forming a partially pre-mixing annulus 17 in an annular space downstream the vortex generator 4 between the fuel sprayer 3 and the chamber 1; and, the fuel sprayer 3 enforces mixing capacity of the vortex air flow for changing original fuel gas sprayed out along a center axis of the combustion device into a low-energy fuel flow sprayed at a specific angle in a radial way by the nozzles 31 of the fuel sprayer 3. These uniformly-distributed and fast-speed vortex air flows are lateral fuel sprays for enhancing effect of mixing. Hence, the high-speed vortex flow field generated by the vortex generator 4 achieves its best mixing effect of fuel and air when the lateral fuel sprays mutually meet to form a flow field having a strong shear stress for achieving the best mixing effect of fuel and air. The fuel flows from the fuel sprayer 3 is sprayed out from the nozzles 31 around in a radial way into the partially pre-mixing annulus 17. The front end of the fuel sprayer 3 is closed along the central axis of the combustion device, where the fuel sprayer comprises a dead-end tip along the central axis. A backflow area is formed at a downstream end of the fuel sprayer 3, where partially-mixed fuel and air encounter at a flushback-restraining part 25, a suddenly-expanding opening, before entering the combustion chamber 23. Thus, a flameholder (flame stabilizing mechanism) is formed at an exit of the nozzle 31 and a flame is generated with the mixed gas by the corresponding igniter 5 at the downstream end. Through the vortex flow field, the flame is turned into a vortex flame while stable combustion in the combustion chamber 23 is obtained via vortex breakdown for providing stabilizing aerodynamics with the combination of the flameholder at the suddenly-expanding opening.

Before a high-temperature gas generated by the combustion leaves the combustion chamber 23 in the cooling air sheath 2, a great amount of cooling air flown around the cooling gas conduit 2 enters into the cooling air sheath 2 through the holes 21, which holes 21 become bigger and bigger along air flowing direction from the front end to the latter end, for mixing, diluting and temperature-lowering. Therein, the smaller holes are located at the former part (flame area) of the combustion chamber 23 for preventing combustion from interruption of the cooling air; and, the bigger holes 21 are located at the latter part (high-temperature gas area) of the combustion chamber 23 for directly and fully diluting the high-temperature gas to reduce temperature. Thus, temperature of the mixed gas is reduced to prevent wall deformation of the combustion chamber 23 and damage of the blades 41 of the turbine 8. After the high-temperature gas leaves the combustion chamber 23 of the cooling air sheath 2, the gas immediately enters into the turbine 8 to be distended for further activating the turbine 8. Thus, the compressor 7 inter-connected obtains energy to introduce outside air into the compressor 7 and to further increase air pressure in a whole. Through the air distributor 12 connected with the compressor 7, the compressed air is distributed to the non-premixed air conduit 11 and the cooling gas conduit 61. After the turbine 8 obtains a rotating speed high enough to provide an amount of air by itself for stably operating the combustion device, a turbine system is turned on. Then, the high-temperature gas generated by the combustion in the combustion chamber 23 is used to make the turbine 8 rotate for providing the turning power; or, to drive the turbine to further activate the power generator 9, where power is started to be generated by turning on the power generator 9 for continuously providing a stable output voltage through a voltage regulator. Furthermore, the power generator 9 in the turbine system can be inputted with an alternative current (AC) power, which is transformed to be used by a motor for activating the compressor 7 for providing compressed air; or, the air distributor 12 of the chamber 1 can be connected with an auxiliary gas source 71 for providing the compressed air for activating the system.

Figure 9:
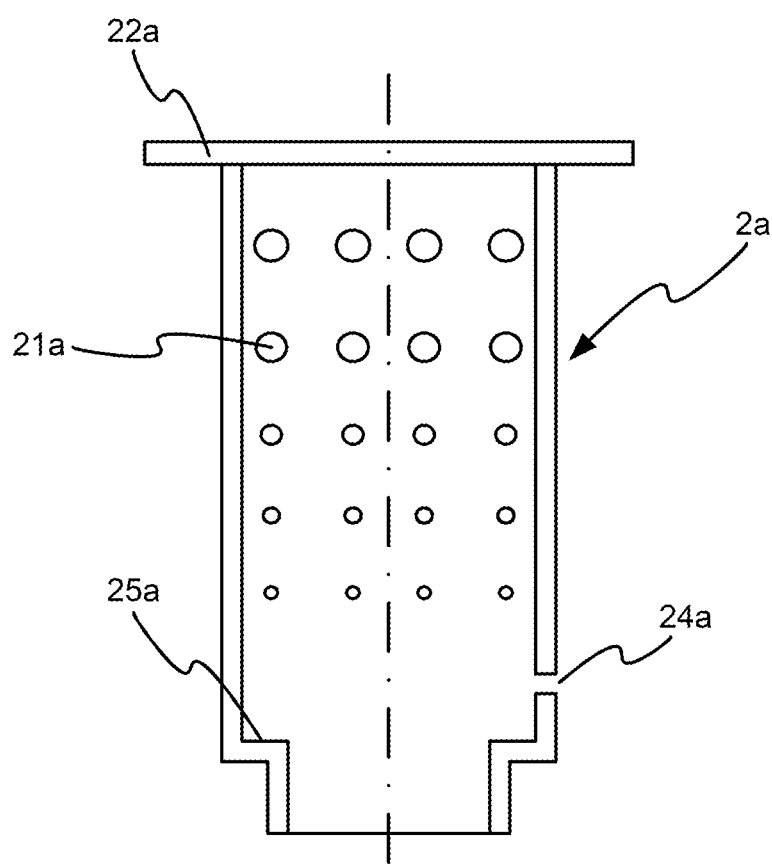
FIG. 9 is the view showing the preferred embodiment of the cooling air sheath.

Please refer to FIG. 9, which is a view showing a preferred embodiment of cooling air sheath. As shown in the figure, a first preferred embodiment of cooling air sheath 2a has a sudden-expansion tube 25a at a position mounted against an end of a chamber (not shown in the figure); a plurality of corresponding holes 24a is set with the tube 25a connected with an igniter (not shown in the figure); and, a flange baffle 22a is set on top of a downstream end of the sheath 2a. Thus, the sudden-expansion tube 25a forms a backflow area at corner to provide a flameholder for stable burning and to effectively restrain flushback.

Figure 10:
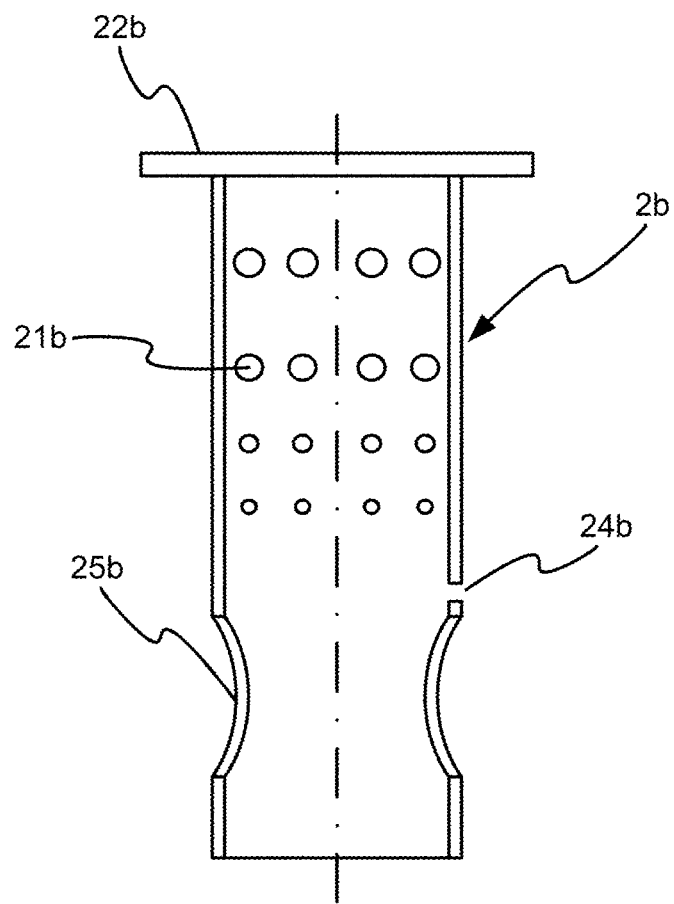
FIG. 10 is the view showing another preferred embodiment of the cooling air sheath.

Please refer to FIG. 10, which is a view showing another preferred embodiment of cooling air sheath. As shown in the figure, a second preferred embodiment of cooling air sheath 2b has a shape of venturi tube 25b at a position mounted against an end of a chamber (not shown in the figure); a plurality of corresponding holes 24b is set while the tube 25b is connected with an igniter (not shown in the figure); and, a flange baffle 22b is disposed on top of a downstream end of the sheath 2b. Thus, the venturi tube 25b enhances speed of air flow at a neck section to restrain flushback through aerodynamics.

Figure 11:
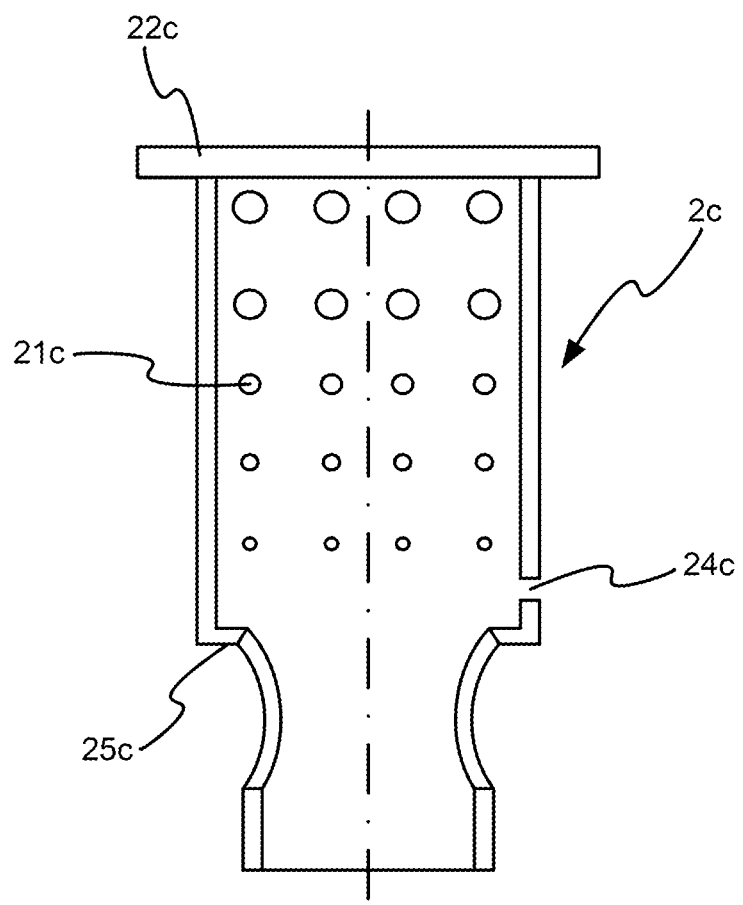
FIG. 11 is the view showing another preferred embodiment of the cooling air sheath.

Please refer to FIG. 11, which is a view showing another preferred embodiment of cooling air sheath. As shown in the figure, a third preferred embodiment of cooling air sheath 2c has a sudden-expansion tube followed with a venturi tube 25c at a position mounted against an end of a chamber (not shown in the figure); a plurality of corresponding holes 24c is set while the tube 25c is connected with an igniter (not shown in the figure); and, a flange baffle 22c is disposed on top of a downstream end of the sheath 2c. Thus, the venturi tube enhances speed of air flow and the sudden-expansion tube 25a forms a backflow area at corner to provide flameholder for effectively restraining flushback.

Figure 12:
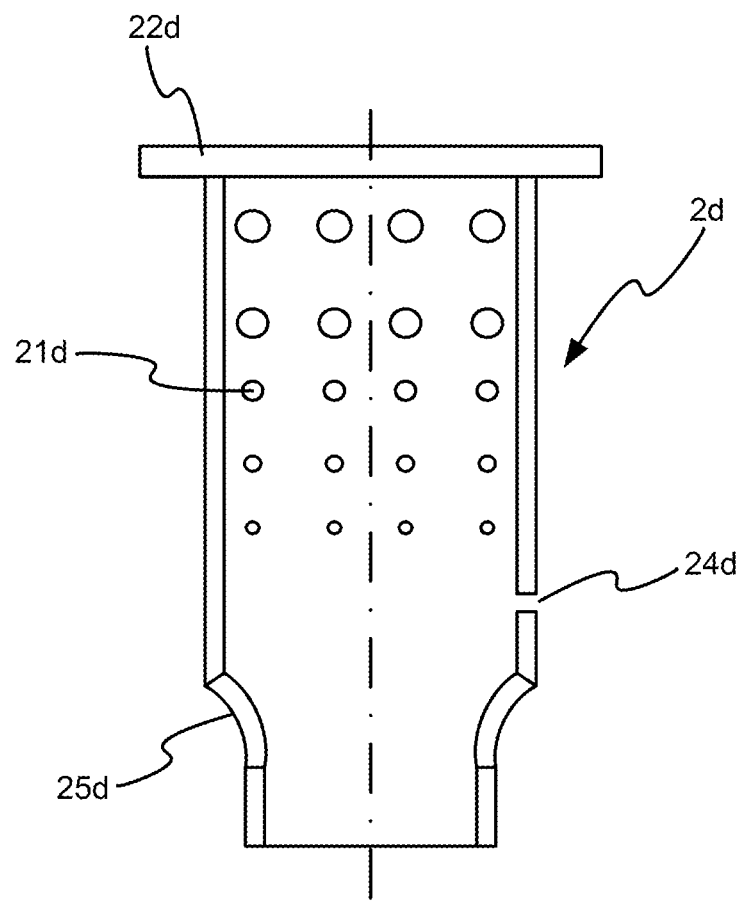
FIG. 12 is the view showing another preferred embodiment of the cooling air sheath.

Please refer to FIG. 12, which is a view showing another preferred embodiment of cooling air sheath. As shown in the figure, a fourth preferred embodiment of cooling air sheath 2d has a gradually-expanding (semi-venturi) tube 25d at a position mounted against an end of a chamber (not shown in the figure); a plurality of corresponding holes 24d is set while the tube 25d is connected with an igniter (not shown in the figure); and, a flange baffle 22d is disposed on top of a downstream end of the sheath 2d. Thus, the gradually-expanding tube 25d gradually enhances speed of air flow and forms a backflow area at corner for restraining flushback.

To sum up, the present invention is a hydrogen-rich gas combustion device, where fuel and air are non-premixed before entering into a chamber for avoiding flushback; a vortex generator and a fuel sprayer are combined to effectively mix fuel and air for enhancing burning effect; vortex flame is generated through an assembly of a cooling air sheath, the vortex generator and the fuel sprayer with coordination of an igniter for providing stable aerodynamics of flame through vortex breakdown; a flameholder is formed at a suddenly-extending opening to maintain stable combustion in a combustion chamber; before a high-temperature gas generated by the combustion leaves the combustion chamber, cooling air in the cooling air sheath is used for cooling and then the gas leaves the combustion chamber to activate a turbine for further turning on a power generator to generate power; and, thus, the present invention effectively mixes fuel and air, avoids flushback and prevents damage on the combustor.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A hydrogen-rich gas combustion device, comprising a chamber, a cooling air sheath, a fuel sprayer, a vortex generator, an igniter and a vessel shell,
   wherein said chamber has a non-premixed air conduit inside; said chamber has an air distributor at an upstream end of said chamber corresponding to said non-premixed air conduit; and said chamber has a non-premixed fuel conduit at a side of said chamber;
   wherein said cooling air sheath is positioned at an opposite downstream end of said chamber; said cooling air sheath has a plurality of holes on a surrounding wall of said cooling air sheath; said cooling air sheath defines a combustion chamber inside; and said cooling air sheath has a first corresponding hole to accommodate said igniter;
   wherein said fuel sprayer is located in said chamber; and said fuel sprayer is connected with said non-premixed fuel conduit;
   wherein said vortex generator is positioned around said fuel sprayer; and
   said vortex generator defines a partially pre-mixing annulus downstream in an annular space between said fuel sprayer and said combustion chamber;
   wherein said igniter is located at a side of said cooling air sheath and is corresponding to said fuel sprayer; and
   wherein said vessel shell is sleeved outside around said chamber and said cooling air sheath to define a cooling air conduit in said vessel shell; and said vessel shell has a second corresponding hole to be connected with said non-premixed fuel conduit,
   wherein said chamber has an opening at said opposite downstream end of said chamber; said non-premixed fuel conduit is connected with said opening; and said fuel sprayer is located in said opening,
   wherein said chamber has a plurality of connecting holes around said opening of said chamber; said non-premixed air conduit is connected with said plurality of connecting holes; and said vortex generator is located downstream of said plurality of connecting holes opposite to said cooling air sheath.

2. The device according to claim 1, wherein said chamber has a stopper around an outside surface of said chamber; and an end of said cooling air sheath is mounted against said stopper.

3. The device according to claim 1, wherein said air distributor is further connected with a compressor; said cooling air sheath and said vessel shell are connected with a turbine through a combustor outlet; and said turbine is connected with a power generator.

4. The device according to claim 1, wherein said air distributor is further connected with a compressor; and said cooling air sheath and said vessel shell are connected with a power turbine through a combustor outlet to provide mechanical drive power to operate rotational machinery.

5. The device according to claim 1, wherein said plurality of holes of said cooling air sheath is distributed along a gas flow direction into a plurality of rows having an equal interval between neighboring rows; and a diameter of said hole in each of said rows increases along said gas flow direction.

6. The device according to claim 1, wherein said cooling air sheath is a cylinder and has a flange baffle disposed on top of a downstream end of said cooling air sheath.

7. The device according to claim 1, wherein said cooling air sheath defines a sudden-expansion tube at a position mounted against the downstream end of said chamber and has a flange baffle disposed on top of the downstream end of said cooling air sheath.

8. The device according to claim 1, wherein said cooling air sheath defines a shape of a Venturi tube at a position mounted against the downstream end of said chamber and has a flange baffle disposed on top of a downstream end of said cooling air sheath.

9. The device according to claim 1, wherein said cooling air sheath has a combined shape of a Venturi followed with a sudden-expansion tube at a position mounted against the downstream end of said chamber and has a flange baffle disposed on top of a downstream end of said cooling air sheath.

10. The device according to claim 1, wherein said cooling air sheath has a gradually-expanding (semi-Venturi) tube at a position mounted against an end of said combustion chamber and has a flange baffle disposed on top of the downstream end of said cooling air sheath.

11. The device according to claim 1, wherein said fuel sprayer has a plurality of nozzles arranged with a certain angle relative to a flow direction around said fuel sprayer to spray fuel in a radial way to further interact with air downstream of said vortex generator to uniformly mix fuel with air.

12. The device according to claim 1, wherein said fuel sprayer has a plurality of nozzles arranged with a certain angle around said fuel sprayer; said fuel sprayer has a dead-end tip along a central axis of said device; and, combined with said cooling air sheath mounted against a stopper of said chamber, an expanding opening is formed adjacent said fuel sprayer and a flameholder is configured at an outlet of said fuel sprayer.

13. The device according to claim 1, wherein said vortex generator has a plurality of blades; and air in said non-premixed air conduit of said chamber is guided by said plurality of blades to change flowing direction and generates a swirling flow field around said fuel sprayer.

14. A hydrogen-rich gas combustion device, comprising a chamber, a cooling air sheath, a fuel sprayer, a vortex generator, an igniter and a vessel shell, wherein said chamber has a non-premixed air conduit inside; said chamber has an air distributor at an upstream end of said chamber corresponding to said non-premixed air conduit; and said chamber has a non-premixed fuel conduit at a side of said chamber;

wherein said cooling air sheath is positioned at an opposite downstream end of said chamber; said cooling air sheath has a plurality of holes on a surrounding wall of said cooling air sheath; said cooling air sheath defines a combustion chamber inside; and said cooling air sheath has a first corresponding hole to accommodate said igniter;

wherein said fuel sprayer is located in said chamber; and said fuel sprayer is connected with said non-premixed fuel conduit;

wherein said vortex generator is positioned around said fuel sprayer; and said vortex generator defines a partially pre-mixing annulus downstream in an annular space between said fuel sprayer and said combustion chamber;

wherein said igniter is located at a side of said cooling air sheath and is corresponding to said fuel sprayer; and wherein said vessel shell is sleeved outside around said chamber and said cooling air sheath to define a cooling air conduit in said vessel shell; and said vessel shell has a second corresponding hole to be connected with said non-premixed fuel conduit, and wherein said chamber has a stopper around an outside surface of said chamber; and an end of said cooling air sheath is mounted against said stopper.

* * * * *